Sept. 8, 1931.   M. G. CHANDLER   1,822,011
FUEL FEEDING MEANS FOR INTERNAL COMBUSTION ENGINES
Filed Aug. 29, 1928
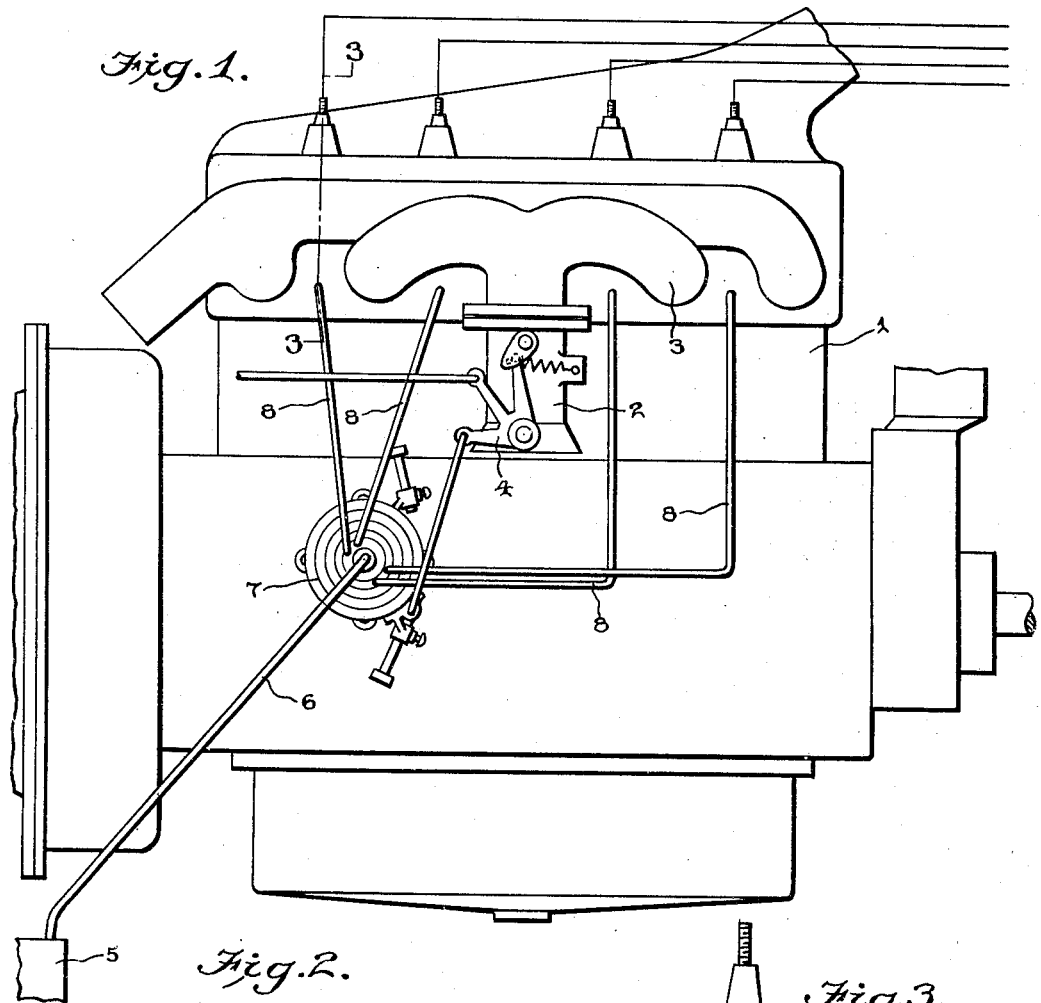
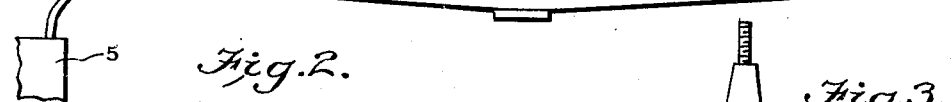
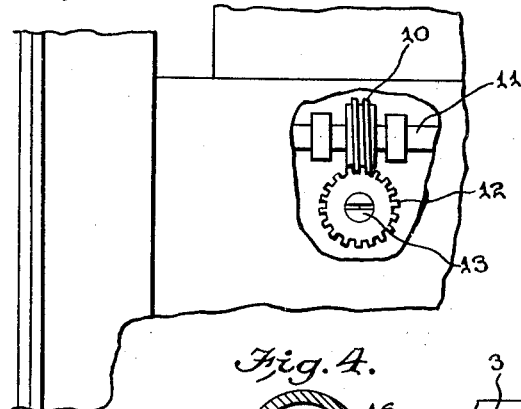
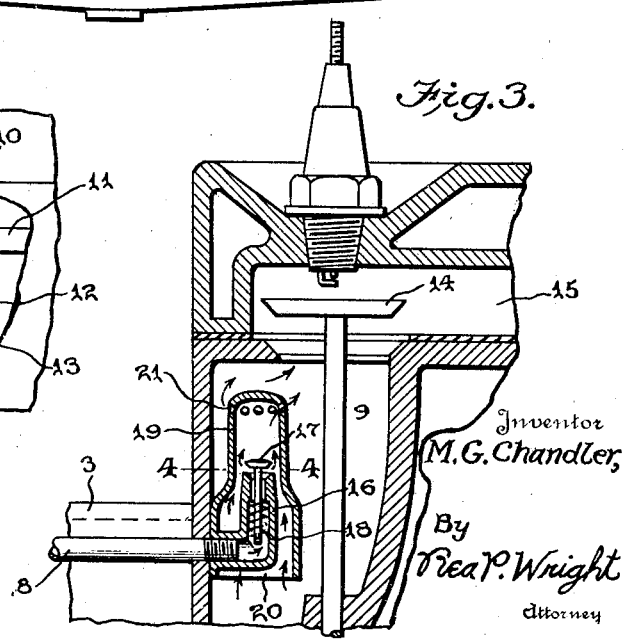

Patented Sept. 8, 1931

1,822,011

UNITED STATES PATENT OFFICE

MILFORD G. CHANDLER, OF FLINT, MICHIGAN

FUEL FEEDING MEANS FOR INTERNAL COMBUSTION ENGINES

Application filed August 29, 1928. Serial No. 302,858.

This invention relates to explosive mixture feeding means for internal combustion engines.

It has been heretofore been proposed to admit air in regulated quantities to internal combustion engines, and to utilize a pump for mixing with the air as it enters the cylinders, measured amounts of liquid fuels, such as gasoline. In my pending application, Serial No. 290,492, filed July 5, 1928, I have disclosed a structure of this character, and the primary object of the present invention is to provide improved means for intimately mixing the air with the fuel as the air is entering each cylinder of the engine.

Another object of the invention is to combine with each fuel nozzle, a perforated cap structure designed to be associated with the fuel nozzle, and to place an annular stream of air about the fuel as its is discharged from the nozzle, and to thoroughly combine this stream with the fuel before the explosive mixture enters the combustion chamber of the cylinder.

A further object is to furnish simple inexpensive means for thoroughly mixing fuel pumped to the cylinders, with air at the time the latter is about to enter the combustion chambers of the cylinders.

An additional object is to provide an internal combustion engine with main passageways leading to the cylinders, and having the usual intake valves, and to combine therewith, means for intermittently introducing fuel into said passageways in timed relation to the movement of said valves, and for intimately mixing said fuel with air flowing through the passageways.

With the foregoing objects outlined and with other objects in view which will appear as the description proceeds, my invention consists in the novel features hereinafter described in detail, illustrated in the accompanying drawing and more particularly pointed out in the appended claims.

Referring to the drawings,

Fig. 1 is a side elevation of an engine having fuel and air feeding means of the type to which the present invention may be applied.

Fig. 2 is a detail, illustrating the means for driving the pump from the cam shaft of the engine.

Fig. 3 is an enlarged vertical sectional view of a detail, taken on line 3—3 of Fig. 1.

Fig. 4 is a section taken on line 4—4 of Fig. 3.

The drawings show a four-cylinder internal combustion engine 1, to which the invention may be applied. Air is fed to the cylinders by a conduit 2 connected to the usual multi-passageway intake manifold 3. The passage of air through the conduit is regulated by a valve (not shown), controlled by any suitable means, including a lever 4.

The fuel is drawn from a supply tank 5, through a pipe 6, by means of a special pump 7 of the type disclosed in my above mentioned co-pending application, and this pump acts to feed the fuel intermittently in proper sequence through pipes 8 to the respective intake passageways 9 of the cylinders.

From Fig. 2, it may be seen that the pump is driven by a worm gear 10 on the valve actuating cam shaft 11 of the engine, and this worm gear drives a worm pinion 12 on a shaft 13, which transmits the movement to the shaft of the pump.

As shown in Fig. 3, each cylinder has the usual intake valve 14 arranged between its intake passageway 9, and its combustion chamber 15, and during the operation of the engine, on each suction stroke, the valve 14 will be opened by the movement of the cam shaft 11, so that air will be drawn into the cylinder, through the conduit 2, and at this time, the pump 7, acting in timed relation with the valves 14, will force a charge of fuel through one of the pipes 8, to the air intake 9 of that cylinder. This fuel will be discharged through a nozzle 16 having a valve 17 which is normally closed by a spring 18.

The parts just described are all shown in my prior application, and the present application is directed partly to improved means for mixing the air and fuel within the passageway 9. To this end each fuel nozzle is combined with a cap 19 having a flared lower end 20 through which the air enters. As the air passes upwardly, it will assume annulus form, and into this annulus, the fuel will be injected by the pump 7. The resulting mixture will continue upwardly and pass through the apertures 21 which will divide the mixture into a multiplicity of fine streams, and these streams will then be commingled with the air traveling upwardly on the exterior of the cap or shell 19. In this way, the fuel in effect will first be mixed with an annulus of primary air, and subsequently, the mixture thus formed will be admixed thoroughly with auxiliary air, and the combined mixtures will flow into the combustion chamber in proper condition for the explosion.

I have selected the invention disclosed in my before mentioned application, for the purpose of disclosing the present invention, but I am aware that the present invention may be used in any arrangement in which the fuel is fed by a pump directly to the cylinders, and mixed with the air before entering the combustion chambers of the cylinders.

From the foregoing, it is believed that the construction, operation and advantages of the invention may be readily understood, and I am aware that changes may be made in the details disclosed, without departing from the spirit of the invention, as expressed in the claims.

What I claim and desire to secure by Letters Patent is:

1. In an internal combustion engine, a cylinder, a passageway for feeding fuel and air to the cylinder, a valve for controlling the admission of the fuel mixture to the cylinder, means including a nozzle for forcibly feeding fuel into the passageway, a tubular perforated member in the passageway for mixing the fuel with primary air, and means in the passageway for subsequently admixing said mixture with auxiliary air and admitting said mixture to the cylinder after the control valve has been moved into open position.

2. In an internal combustion engine, a cylinder, a main passageway leading to said cylinder, a valve intervening between said passageway and said cylinder, means for moving said valve, a secondary passageway in said main passageway, means for admitting air to both said passageways, and means for forcibly injecting fuel into said secondary passageway in timed relation to the movement of said valve.

3. In an internal combustion engine, a plurality of cylinders, a main passageway leading to each of said cylinders, a valve interposed in each of said passageways, means for moving said valves, a secondary passageway in each of said main passageways, the outer end of each of the passageways being open to admit air to the main and secondary passageways, and means for forcibly injecting fuel into said secondary passageways in timed relation to the movement of said valves.

4. In combination, an internal combustion engine cylinder, a conduit for forming a passageway for feeding air to the cylinder, means including a nozzle for discharging fuel into said passageway, a tubular member arranged in said passageway and surrounding said nozzle, said tubular member having an open lower end and a closed upper end spaced from the outlet end of said nozzle, the wall of said tubular member adjacent its closed end being perforated, said tubular member being so located in the passageway as to permit air traveling therethrough to pass through and around said tubular member.

5. In combination, an internal combustion engine cylinder, a passageway for feeding air to the cylinder, means including a nozzle for discharging fuel into the passageway, a tubular member arranged in the passageway and surrounding said nozzle having a closed upper end, the wall of said tubular member being provided with perforations adjacent its closed end, said cap being so located relatively to the nozzle and passageway as to permit air to travel through and around said tubular member.

6. In combination, an internal combustion engine cylinder, a passageway for feeding air to the cylinder, means including a nozzle for discharging fuel into said passageway in a direction of the direction of travel of air passing therethrough, a tubular member surrounding said nozzle in said passageway having a closed upper end, said tubular member being provided with an annular row of perforations, said means being adapted to divide the mixture into a multiplicity of streams that are discharged in said passageway at an angle to the passage of air therethrough.

7. In combination, an internal combustion engine cylinder, a passageway for feeding air to the cylinder, means including a nozzle for discharging fuel into said passageway, a tubular member surrounding said nozzle and said passageway having an open lower end in the path of travel of air passing therethrough and a closed upper end, said tubular member having perforations in its wall for discharging a mixture of air and fuel into the path of travel of the volume of air passing through said passageway at an angle to the path of travel of the air therethrough.

In testimony whereof I hereunto affix my signature.

MILFORD G. CHANDLER.